(12) United States Patent
Hovmand

(10) Patent No.: US 11,927,283 B2
(45) Date of Patent: Mar. 12, 2024

(54) ACTIVE SEALING RING, IN PARTICULAR FOR AN AUTO COUPLING

(71) Applicant: Grundfos Holding A/S, Bjerringbro (DK)

(72) Inventor: Per Hovmand, Bjerringbro (DK)

(73) Assignee: Grundfos Holding A/S, Bjerringbro (DK)

( * ) Notice: Subject to any disclaimer, the term of this patent is extended or adjusted under 35 U.S.C. 154(b) by 328 days.

(21) Appl. No.: 17/369,696

(22) Filed: Jul. 7, 2021

(65) Prior Publication Data

US 2022/0010901 A1 Jan. 13, 2022

(30) Foreign Application Priority Data

Jul. 8, 2020 (EP) ...................... 20184758

(51) Int. Cl.
*F16L 23/18* (2006.01)
*F04D 3/00* (2006.01)
*F04D 29/08* (2006.01)
*F16J 15/02* (2006.01)
*F16J 15/48* (2006.01)

(52) U.S. Cl.
CPC .............. *F16L 23/18* (2013.01); *F04D 3/00* (2013.01); *F04D 29/08* (2013.01); *F16J 15/022* (2013.01); *F16J 15/48* (2013.01)

(58) Field of Classification Search
CPC ......... F16L 23/18; F16L 23/16; F16L 23/162; F16L 17/06; F16L 17/063; F16L 17/032; F16L 17/025; F16L 17/067; F04D 29/08; F16J 15/025; F16J 15/08; F16J 15/02; F16J 15/022; F16J 15/021; F16J 15/121
See application file for complete search history.

(56) References Cited

U.S. PATENT DOCUMENTS

| | | | |
|---|---|---|---|
| 3,197,217 A * | 7/1965 | Mastrobattista | |
| 3,439,407 A * | 4/1969 | Haynie | |
| 3,620,556 A | 11/1971 | Paddington | |
| 4,213,619 A * | 7/1980 | Arlt ...................... F16L 17/025 |
| 4,368,894 A * | 1/1983 | Parmann ................ F16J 15/121 |
| 4,597,583 A * | 7/1986 | Inciong .................. F16J 15/121 |
| 6,152,494 A * | 11/2000 | Corbett, Sr | |
| 2005/0001195 A1 | 1/2005 | Blease et al. | |
| 2008/0252020 A1 | 10/2008 | Heiman et al. | |
| 2010/0109260 A1 | 5/2010 | Mellander | |
| 2016/0003385 A1 * | 1/2016 | Koves ..................... F16L 23/18 |

FOREIGN PATENT DOCUMENTS

| | | |
|---|---|---|
| EP | 2006589 A1 | 12/2008 |
| EP | 3212982 A1 | 9/2017 |
| WO | 2016/069971 A1 | 5/2016 |

* cited by examiner

*Primary Examiner* — William S. Choi
(74) *Attorney, Agent, or Firm* — McGlew and Tuttle, P.C.

(57) ABSTRACT

A sealing ring provides a fluid seal between a first flange and a second flange. The sealing ring forms a tubular element and includes a tapering wall member defining an interior funnel-shaped through-going opening extending axially and tapering from a proximal end to a distal end. The tapering wall member is made from a resilient material proving an axial deflection of the tapering wall member when exposed to an axial force.

20 Claims, 5 Drawing Sheets

ACTIVE SEALING RING, IN PARTICULAR FOR AN AUTO COUPLING

FIELD OF THE INVENTION

The present invention relates to a sealing ring for providing a fluid seal between a first flange and a second flange, the sealing ring forms a tubular element and comprises a tapering wall member defining an interior funnel-shaped through-going opening extending axially and tapering from a proximal end to a distal end, the tapering wall member being made from a resilient material proving an axial deflection of the tapering wall member when exposed to an axial force.

BACKGROUND OF THE INVENTION

In some practical implementation of a pump support where the pump is located in a general in-accessible position such as a pump well, repair or service of the pump support and in particular the pump (motor and pump house with impeller(s)) is often very difficult due to limited space. One solution is to arrange the pump on a base part in a manner, where the pump is fixed on the base part due to gravity acting on the pump. To allow easy cleaning and maintenance of the pumps without getting in contact with the dirty water the common solution is a system for easy lifting the pump out of the well and lower it again called an auto coupling. A guide claw is fixed to the pump guiding the pump during lifting/lowering on guide rods and connecting the pump to a base fixed to the bottom of the well. In the low position the pump is via the guide claw rigidly connected in upper and lower contact points on the base using the gravity to create the contact force. Lifting the pump unloads the contact forces.

In such and other configurations the flow channel from the outlet of the pump to and through the base is pieces together by various parts which needs to be sealed against each other to form, at least during pumping, a fluidicly sealed flow path. While an ordinary flat gasket made of e.g. rubber, silicone or other flexible material can be arranged in-between surfaces of the various parts, such gaskets have shown to be difficult to use in implementations utilizing a guide claw. There are numerous sources for less successful applications of ordinary gaskets where one of the more profound sources is that such gasket often requires a manual handling of both the parts to be sealed and the gasket itself to arrange all parts in sealed position.

Further, an ordinary flat gasket requires a compression to be tight. This gives some drawbacks, especially in applications using a guide claw and a base to allow the pump to connect or disconnect to the outlet pipe when lowered or elevated. One drawback being that the pump must be lowered in an angle and turning into position to compress the gasket. If the angle in some situation are not big enough there is a risk that the pump get stuck before the guide claw and gasket has come to the correct position and the gasket will not be tight. Another drawback is that the sealing function is relatively sensitive to positioning of the guide claw relative to the base.

Hence, an improved sealing ring would be advantageous and in particular a sealing ring which is more efficient and/or reliable to use would be advantageous.

Alternatively or in combination, the pump is lowered in an angle and not sensitive to the position of the guide claw relative to the base would be advantageous.

OBJECT OF THE INVENTION

It may be seen as an object of the present invention to a provide a sealing ring that solves one or more of the above mentioned problems.

It is a further object of the present invention to provide an alternative to the prior art.

SUMMARY OF THE INVENTION

Thus, the above described object and several other objects are intended to be obtained in a first aspect of the invention by providing a sealing ring for providing a fluid seal between a first flange and a second flange, the sealing ring forms a tubular element and comprises a tapering wall member defining an interior funnel-shaped through-going opening extending axially and tapering from a proximal end to a distal end, the tapering wall member being made from a resilient material proving an axial deflection of the tapering wall member when exposed to an axial force;

a first abutment surface provided at the proximal end for providing a fluid seal when abutting a surface of one of the flanges;

a second abutment surface provided at the distal end for providing a fluid seal when abutting a surface of another one of the flanges;

a reinforcement member made from a stiffer material than the material of the tapering wall member and being shaped as a closed ring-shaped element with an axial extension being smaller than the axial distance between the proximal end and the distal end, said reinforcement member being arranged in or on the tapering wall member at an axial position between proximal end and the distal end so as to limit or prevent outward or inward deflection of at least a part of the tapering wall member when a pressure difference is applied across the tapering wall member.

Terms used herein are used in manner being ordinary to a skilled person. Some of these terms will be elaborated on in the following:

"Ring" such as used in a sealing ring is preferably meant to denote a closed loop element or member which could be but not limited to circular. According ring may also refer to a polygonal shaped element or member.

"Tapering wall member" is preferably used to reference a member having two opposing wall sides both of which preferably are tapering in the same direction.

"Resilient material used herein, is typically although non-limiting used to reference a resilient material such as elastomers typically being non-linear materials, a hyperelastic material and/or materials having a Young's modulus up till a strain of 10% around 2-5 MPa.

In some preferred embodiment of the sealing ring, the tapering wall member may have a frusto-conical shape and the reinforcement member may be a circular member.

In some preferred embodiments of the sealing ring, the angle of the tapering wall member relatively to the axial direction may be less than 75 degrees, such as less than 45 degrees, such as less than 40 degrees, preferably less than 35 degrees, such as less than 30 degrees, preferably less than 25 degrees, such as less than 20 degrees, preferably less than 15 degrees and preferably larger than 10 degrees.

In some preferred embodiments of the sealing ring, the reinforcement member may have a uniformed, preferably circular, cross section preferably throughout its extension.

In some preferred embodiments of the sealing ring, the reinforcement member may be embedded in the tapering wall member.

In some preferred embodiments of the sealing ring, the thickness of the tapering wall member may be locally increased in a region encircling the embedded reinforcement member.

In some preferred embodiments of the sealing ring, the axial position at which the reinforcement member may be arranged may be at half the distance between the proximal end and the distal end or may be at the distal end.

In some preferred embodiments of the sealing ring, the sealing ring may comprise an outwardly extending ring-shaped protrusion preferably at the proximal end, the outwardly extending ring-shaped protrusion may have a first surface facing in opposite direction than towards the distal end and preferably defining at least a part of the first abutment surface.

In some preferred embodiments of the sealing ring, the outwardly extending ring-shaped protrusion may be configured to be fastened to, e.g. by being clamped against, the first or second flange preferably with the first abutment surface abutting a surface of said first or second flange.

In some preferred embodiments of the sealing ring, the outwardly extending ring-shaped protrusion may comprise an indentation preferably arranged opposite the first abutment surface, said indentation being preferably configured to co-operate with a clamping ring for clamping the ring-shaped protrusion against the first or second flange.

In some preferred embodiment of the sealing ring, the sealing ring may be configured to fit snugly into a recess provided in the first flange or the second flange.

In some preferred embodiments of the sealing ring, the distal end may have a second surface facing in opposite direction than towards the proximal end and preferably defining at least a part of the second abutment surface.

In a second aspect, the invention relates to a pump support preferably comprising a first flange, a second flange and a sealing ring according the first aspect of the invention. The first and the second flange are preferably configured to be connected with each other with the sealing ring disposed there in-between. Both flanges comprises through going openings aligned when connected to each other with the sealing ring encircling the openings. Preferably, first flange may be configured for carrying or form part of a pump housing and the second flange may preferably form part of a fluid channel configured for receiving fluid from the pump housing and delivery the fluid at a delivery position. The sealing ring may be arranged to provide a sealing between the first flange and the second flange.

In third aspect, the invention relates to a method of providing a sealing between two flanges of the pump support according to the second aspect of the invention. The method preferably comprises
- arranging the sealing ring on one of the first and second flanges,
- connecting the two flanges with theirs through-going openings aligned with the sealing ring encircling said through-going openings.

BRIEF DESCRIPTION OF THE FIGURES

The present invention and in particular preferred embodiments thereof will now be described in greater details with reference to the accompanying figures. The figures show ways of implementing the invention and are not be construed as being limiting to other possible embodiments falling within the scope of the attached claim set.

DETAILED DESCRIPTION OF AN EMBODIMENT

Figure 1:
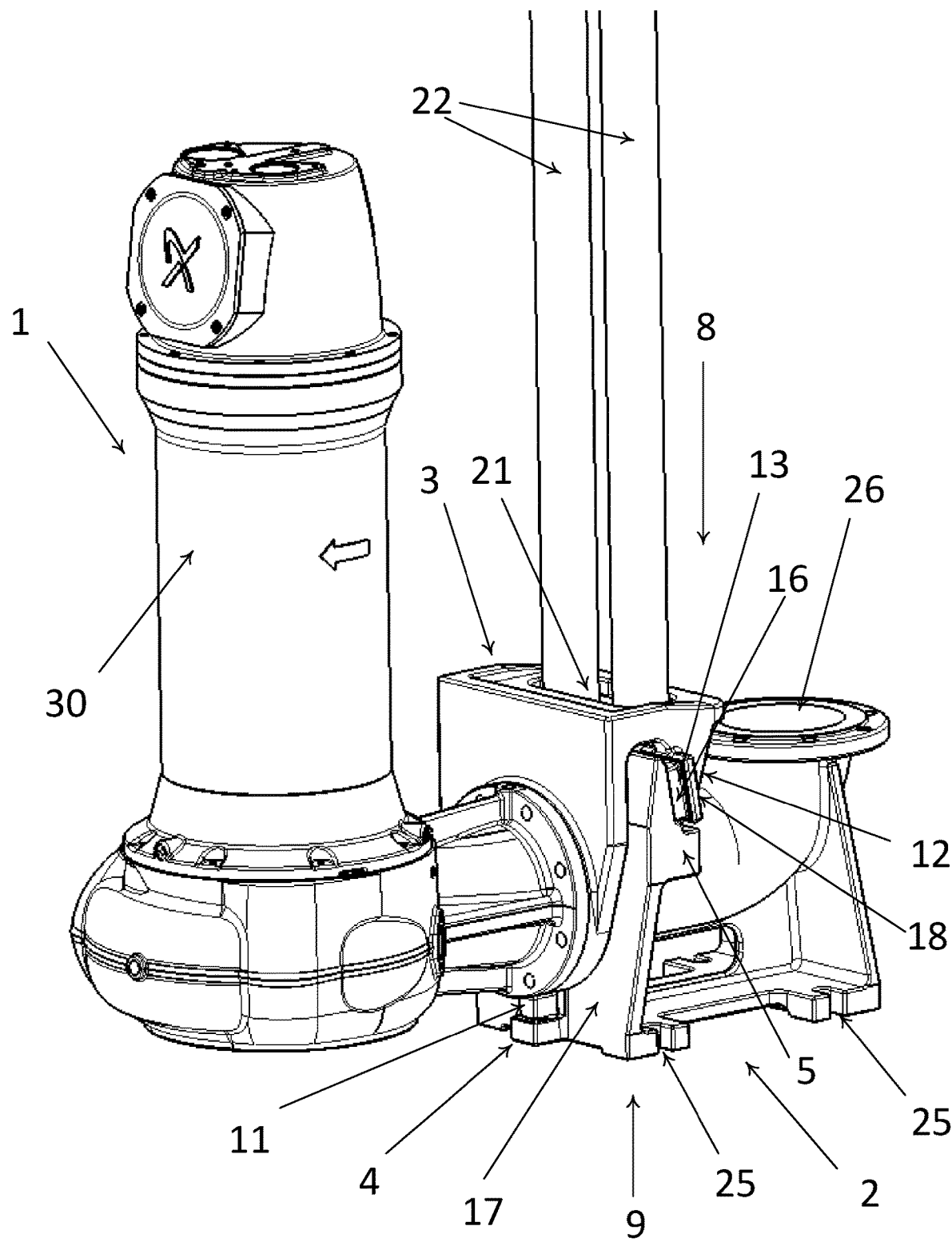
FIG. 1 illustrates a preferred embodiment of a pump support according to a preferred embodiment of the present invention.

Reference is made to FIG. 1 illustrating a preferred embodiment of a pump support according to a preferred embodiment of the present invention.

Figure 2:
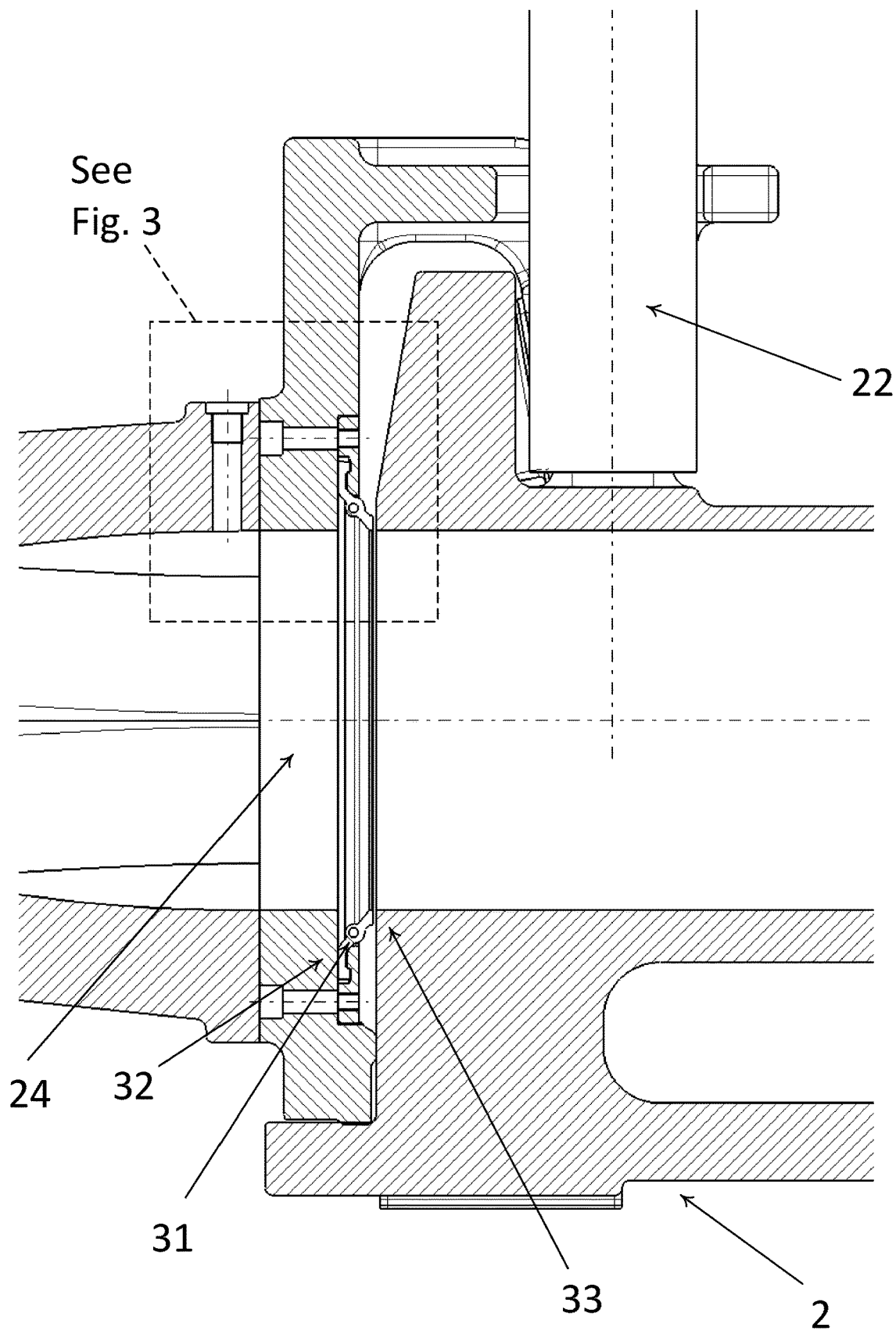
FIG. 2 illustrates as a cross sectional view of a sealing ring according a preferred embodiment of the present invention, wherein the sealing ring is arranged in the pump support shown in FIG. 1, FIGS. 3A and 3B illustrate details of the sealing ring as a close-up of FIG. 2.

With reference to FIGS. 1 and 2 a particular preferred application of a sealing ring according to the invention will be disclosed. FIGS. 1 and 2 inter alia show a pump support with a pump 1 arranged on a base part 2 by use of a guide claw 3.

The pump support has a first flange 32 on the guide claw 3, a second flange 33 on the base part 2 and a sealing ring 31 according a particular preferred embodiment of the invention. The first and the second flange 32, 33 are configured to be connected with each other with the sealing ring 31 disposed there in-between. By configured to is typically meant that the dimensioning of the flanges and properties of their surfaces are so that the sealing ring 31 may be accommodated in between the flanged to provide a seal at least during operation of the pump.

As is clear from FIGS. 1 and 2, the fluid flow from the pump goes through guide claw 3 and into a channel formed in the base part 2. The fluid leaves the base part 2 through the opening at the rear end of the base part 3. Thus, both flanges 32, 33 comprising through going openings aligned when connected to each other with the sealing ring 31 encircling the openings. Accordingly, the first flange 32—or guide claw 3 in general—is configured for carrying or form part of a pump housing and the second flange 33 forms part of a fluid channel configured for receiving fluid from the pump housing and delivery the fluid at a delivery position with the sealing ring 31 arranged to provide a sealing between the first flange 32 and the second flange 33.

When the sealing ring is to be applied to a pump construction, this typically involves the steps of arranging a sealing ring 31 on one of the first and second flanges 32, 33 and connecting the two flanges 32, 33 with theirs through-going openings aligned with the sealing ring 31 encircling said through-going openings.

Reference is made to FIG. 2 illustrating as a cross sectional view of a sealing ring according a preferred embodiment of the present invention, wherein the sealing ring is arranged in the pump support shown in FIG. 1.

Reference is made to FIG. 1. This figure illustrates a preferred embodiment of a pump support. The pump support may have a longitudinal direction which in the embodiment shown is aligned with the flow direction out of the pump and into the pipe of the base.

The pump support as illustrated has a base part 2 with a lower end 9 and an upper end 8 wherein the base part 2 is configured for mounting the pump support at its lower end

9 to a pump support carrying member such as a floor. In FIG. 1, indentations 25 are provided which are used to receive bolts screwed into the carrying member thereby mounting the base part 2 to the carrying member 10. In some embodiments, a resilient element may be arranged between the base part 2 and the carrying member.

The base part comprising an end face 17. As illustrated in FIG. 2, the end face 17 forms an opening (see FIG. 2) into a tubular section of the base part 2, which opening forms an inlet for liquid received from the pump. During use of the pump support, fluid flows through the opening in the end face 17, through the tubular section and leaves the base part 2 through the opening 26 in the base part forming an outlet. A pipe (not illustrated) is connected to the base part 2 at the opening 26 to pump the fluid pumped to a position distant to the base part 2.

The pump support further comprises a guide claw 3 adapted for carrying a pump 1. The pump is connected to the guide claw via outlet pipe of the pump 1. As perhaps most clearly visible in FIG. 2, the guide claw 3 has a section interposed between a flange of the pump and the base part so that the fluid flows out of the pump 1, through the through going opening 24 and into the channel provided in the base part 2. As disclosed herein, a sealing ring 31 is disposed between the guide claw 3 and the based part 2. The pump 1 is illustrated as being bolted to the guide claw 3, but may be attached to the guide claw 3 in other ways, such as being made integral with the guide claw 3. Accordingly, in some preferred embodiments, the guide claw 3 forms part of a channel leading fluid from the pump 1 to the opening 26.

The pump house forms as illustrated an internal void inside which an impeller (or a number of impellers) is arranged (not shown). The impeller is driven by an electrical motor 30 (see FIG. 1) such as by the impeller arranged on the rotational shaft of the motor. When the pump support is configured with a motor and impeller(s), the housing of the motor is arranged at the upper opening of the pump house 1 in a sealed manner. The pump 1 further comprising a fluid inlet arranged below the impeller(s) so that upon activation of the motor, the impeller(s) will pump fluid through the inlet through impeller(s) and deliver fluid to the tubular section of the base part 2 through the outlet pipe of the pump and through the opening in the guide claw 3.

The guide claw 3 is configured for connecting the pump 1 with base part 2 at the end face 17. The connection is a releasable connection and in order to assure inter alia that guide claw 3 is positioned on base part 2 so that the outlet of the pump 1 mate with the opening of the base part 2 (the position shown in FIG. 2) the guide claw 3 has been provided with a second guide member 11 and a first guide member 12. However, the second guide member 11 can be arranged at other positions that on the guide claw 3.

The base part 2 has been provided with support parts co-operating with the guide members. A lower support part 4 at the lower end 9 is provided and configured for supporting a pump a non-resilient manner in longitudinal direction towards the base part 2 and vertical direction towards the lower end 9. The lower support part 4 acts as an end-stop in the sense that when the guide claw 3 is arranged on the base part 2, the movement of the lower part of guide claw 3 downwardly and towards the base part 2 is prevented. By non-resilient manner is preferably meant that no resilient material is arranged between the second guide member 11 and the lower support part 4.

At the upper end 8 of the base part 2, an upper support part 5 is arranged. The upper support part 5 has a vertically inclined support surface 16 and the upper support part 5 is configured for supporting said first guide member 12. It is emphasized that the support surface 16 may not be vertically inclined, and can be vertical. During normal operation, there is no direct contact between the support surface 16 and the first guide member 12 since a resilient element 13 is placed in between these two.

As illustrated, the first guide member 12 is arranged in a retracted position relatively to a front part of the guide claw 3 and protrude downwardly thereby providing an opening for the upper support part 5 to extend in, when the guide claw 3 is arranged on the base part 2. The first guide member 12 extends inclined downward whereby the opening in which the upper support part 5 is arranged is tapering in upward direction. If the support surface 16 is not inclined the first guide member 12 preferably extends non inclined and vertically. The resilient element 13 is fixed either on the upper support part 5 or on the first guide member 12. Thereby the resilient element 13 does not fall off, when the guide claw is lifted.

The tapering between the upper support part 5 and the first guide member 12 allows for easy manoeuvring of the guide claw 3 when being positioned on the base part 2 and typically assures that the guide claw is not stuck in an unintended position on the base part 2. Further, the first guide member 12 is in engagement with a resilient element 13 arranged in between the upper support part 5 and the first guide member 12, so that the when gravity acts on the pump 1, the guide claw 3 is resiliently forced towards the support face 16. The reacting moment is taken up by the contact points of the second guide member 11 and the first guide member 12.

A further effect of the tapering is that the upper support part 5 will be guided into engagement with the first guide member 12 with the resilient element 13 in between when the guide claw 3 is lowered downwardly onto the base part 2.

The resilient element(s) 13 plays an advantageous role in connection with the present invention in order to provide elasticity to the pump support to move the lowest eigenfrequency below the lowest excitation frequency of the pump to avoid resonance. The cause of such resonance is often the rotation of the impeller(s) and/or motor which may excite one or more eigenfrequencies of the pump support. If resonances are not avoided even small dynamic forces from imbalance or blade pass will be amplified causing vibration levels that can cause reliability problems in pump and pump control. This is undesirable and the combination of the guide members 11, 12 the resilient element 13 and the support parts 4, 5 are devised to avoid or at least mitigate the risk of such undesirable effects.

As disclosed above, the lower support part 4 receives the second guide member 11 in a non-resilient manner and restrains the movement of the second guide member 1 in longitudinal direction towards the base part 2. The second guide member 11 may be moved horizontally in a direction away from the base part 2 when the pump is moved away from the base part 2, but this movement is prevented or at least minimised by the weight of the pump 1 during operation of the pump 1. This stiff connection together with the resilient element 13 is found to be important to obtain a resonance free operating range of the pump 1.

At the upper part, the insertion of the resilient element 13 in-between the first guide member 12 and the upper support part 5 provides a resilient connection between the guide claw 3 and the base part 2. This set-up provides a substantially stiff lower fixation of the guide claw 3 and a substantially resilient upper fixation of the guide claw 3 to the base part 2 allowing some degrees of movement of the guide claw relatively to the base part 2. The result of this is typically that some of the eigenfrequency(ies) of the guide claw 3 including pump 1 is altered, such as lowered. In some specific embodiments, not all eigenfrequencies are lowered, but the three lowest eigenfrequencies are lowered while maintaining the upper eigenfrequencies high, resulting in the desired broad frequency range with no eigenfrequencies. The lower natural frequencies can be calculated for the pump mass incl. water and guide claw 3 supported by a pivot point at 11 and the stiffness of the resilient elements 13, defined by the Young's module and dimensions. While it is possible to calculate the characteristic of the resilient element 13 (Young's module, dimensions) as well as the eigenfrequencies of the guide claw 3 including pump, such characteristics may equally well be determined by experiments. The lower natural frequencies can be calculated for the pump mass incl. water and guide claw 3 supported by a pivot point at the second guide member 11 and the stiffness of the resilient elements 13, defined by the Young's modulus and dimensions. It can be determined by a full 3D model in a Finite Element model as the relative position of suspension point and the pump's center of gravity has an influence on the calculation. At the same time, higher eigenfrequencies above excitation (dependent primarily on the stiffness of pump house and guide claw) can be determined.

An advantageous aim to be met when devising the resilient element 13 is often that the lowest eigenfrequencies are altered to be below an excitation of the pump. Typically, the excitation is due to an impeller passing by an outlet of the pump and this can be calculated based on the number of blades on the impeller and the rotational speed of the impeller. The excitation force with the lowest frequency is in some situations the imbalance exciting with a frequency=rotational speed in rpm/60. As an example, a four poled electrical motor powered by a 50 Hz power supply rotates with 50*2/4*60=1500 rpm. This results in an imbalance excitation at 25 Hz. However, if the variable frequency drive is set to half the rotational speed, the imbalance excitation is changed to 12.5 Hz. E.g. if the impeller has one blade, rotates with 750 RPM as a minimum and the pump has a single outlet, then characteristic vibration has a frequency of 12.5 Hz. Accordingly, when devising the resilient element 13 one aims at assuring the lowest eigenfrequencies are lower than 12.5 Hz.

As illustrated in FIGS. 1 and 2, the guide claw 3 may have a guide opening 21 configured for co-operating with two vertically arranged guide bars 22 so that the guide claw 3 may slide guided along said guide bars, thereby the guide opening 21 serving as a guide member. The purpose of the guide bars 22 are to roughly position the pump during lowering in order for the guide claw 3 to connect to the base part 2. The tapered angles upwards on surface 21 and 16 are intended to catch the guide claw during lowering from the rough position and move it into a more precise position where the pipe connections are aligned. The guide rods should preferably not be in contact during normal operation.

As shown in this FIG. 2 the sealing ring 31 is arranged for providing a fluid seal between a first flange 32 and a second flange 33 of the pump support. Flange is in this context to be understood in a broad context e.g. as two separate elements adopted to cooperate with one another to form a fluid connection with a sealing ring disposed in between. As seen in FIG. 2, the sealing ring 31 is arranged coaxially with the openings in the flanges 32 and 33 so as to prevent fluid from leaking out between the flanges 32 and 33.

FIG. 3 renders details of the sealing ring even more visible than FIG. 2. As illustrated (see also FIG. 4), the sealing ring 31 is a tubular element. The sealing ring 31 is referred to as having an axial direction and a radial direction, where the axial direction is aligned with the longitudinal direction of the tubular element and the radial direction is perpendicular to this. Kindly observe, that although the sealing ring is disclosed as circular, other shapes are considered to be within the scope of the invention.

The sealing ring has a tapering wall member 35 defining an interior funnel-shaped through-going opening extending axially and tapering from a proximal end 36 to a distal end 37. By this, the proximal end 36 is defined as the end of the sealing ring having the largest opening and the distal end 37 as the opposite end. The sealing ring 31 is preferably arranged so that the narrowing direction of the tapering wall member is in the same direction as the fluid flows.

The tapering wall member 35 is made from a resilient material to provide an axial deflection of the tapering wall member 35 when exposed to an axial force. This axial force is typically provided by a fluid passing through the sealing ring in the tapering direction. Since this fluid typically has a higher pressure than the pressure outside the sealing ring 31, the pressure difference provides an axial force on the interior of the sealing ring. It is noted, that a pressure is a force acting perpendicular to a surface, thus the pressure difference provides both an axial force and a radial force (when the pressure is considered in these two geometrical components). The radial force will be discussed below with respect to a reinforcement member.

The sealing ring 31 has a first abutment surface 38 provided at the proximal end 36 for providing a fluid seal when abutting a surface of one of the flanges 32, 33. This first abutment surface 38 is preferably shaped so as to conform geometrically with the shape of the surface of the flange to abut. In the embodiment shown in FIG. 2, the surface of the flange 33 is flat and radially extending, and the first abutment surface is cantered (shaped) relatively to the proceed of tapering wall member 35 to form a radially extending flat surface.

A second abutment surface 39 is provided at the distal end 37 for providing a fluid seal when abutting a surface of another one of the flanges 32, 33. As for the first abutment surface 38, the second abutment surface 339 is also preferably shaped so as to conform geometrically with the shape of the surface of the flange to abut, which also for the second abutment surface of the shown embodiment means that the surface is cantered (shaped) relatively to the proceed of the tapering wall member 35 to form a radially extending flat surface.

As described above the pressure difference across the sealing ring 31 provides axial force as well as a radial force. While the axial force is used to provide or increase the sealing capabilities of the sealing ring, radial forces have a tendency to distort the sealing ring 31 in an unfavourable manner. In order to increase the sealing ring 31's mechanical stability in radial direction, a reinforcement member 40 made from a stiffer material (e.g. metal) than the material of the tapering wall member 35 is applied. The reinforcement member 40 is in the shown embodiment shaped as a closed ring-shaped element with an axial extension being smaller than the axial distance between the proximal end 36 and the distal end 37. Further, the reinforcement member 40 can be arranged in or on the tapering wall member 35. In the shown embodiment, the reinforcement member 35 is positioned embedded inside the tapering wall member 35 at an axial position between proximal end 36 and the distal end 37. By providing the sealing ring 31 with such a relatively stiffer reinforcement member 40, at least some of the radial forces will be taken up by this member, which limits or even prevents outward deflection of at least a part of the tapering wall member 35 when a pressure difference is applied across the tapering wall member 35. It is noted that in the disclosed embodiment, the radial force is considered to acts radial outwardly, but in case of radial inwardly acting forces, the reinforcement member limits or even prevents inward deflection of at least a part of the tapering wall member 35.

As shown in FIG. 3, the sealing ring 31 may be dimensioned so that a gap 47 is present between the second abutment surface 39 of the sealing ring and the surface of the base part 2. It is however often preferred to dimension the sealing ring so that such a gap 47 is not present. Such gap 47 forms a void as an unsealed passage is provided to ease assembly of the pump support 46 or emerges do to tolerances or movement between the flanges as will be disclosed in the following. As disclosed above, the guide claw 3 of the pump support is lowered onto the base part 2. This lowering typically benefit from a high flexibility of the sealing ring 31 reducing the risk of the guide claw getting stuck during lowering of the guide claw 3 onto the base part 2 at least in order not to damage the sealing ring 1. Further, since the pump support typically is used in an environment (e.g. a fully submerged pump assembly) where some leakage is acceptable during start-up of the pumping action, and the pump quickly provides a pressure in the fluid providing an axial force on the sealing ring 31, the gap 47 will during start-up automatically close due to the axial deflection of the sealing ring 31 caused by the pressure difference. Such a gap at start up may even be found advantageous, since it allows for escape of air trapped inside the pump house.

In the shown embodiment, the tapering wall member 35 is having frusto-conical shape and the reinforcement member 40 is a circular member. This is most clearly shown in FIG. 3 in combination with FIG. 4. It is noted, the labelling frusto-conical shaped refers to the overall shape of the wall member 35 and [6] that this may include as shown in FIG. 3, an optional local thickening of the wall member 35 in the region around the reinforcement member 40.

The angle of the tapering wall member 35 relatively to the axial direction is preferably less than 75 degrees. Relatively to the axial direction is typically meant that the axial direction make up one leg in determination of the angle and a mid-line through the tapering wall member 35 forms the other leg. In some preferred embodiments the angle may be less than 45 degrees, such as less than 40 degrees, preferably less than 35 degrees, such as less than 30 degrees, preferably less than 25 degrees, such as less than 20 degrees, preferably less than 15 degrees and preferably larger than 10 degrees. Without being bound by theory, an optimum angle has been found to be 45 degrees and advantageous solutions can be +/−30 degrees or less than 75 degrees and larger than 15 degrees.

In order to obtain a uniform reinforcement of the sealing ring 31, the reinforcement member 40 has a uniformed, preferably circular, cross section throughout its circumferential extension. However, different circumferential sections of the sealing ring 31 may be provided with different cross sections.

An advantageous way of introducing the reinforcement member 40 to the sealing ring 31 is to embed the reinforcement member 40 in the tapering wall member 35. By embedding is typically meant that no part(s) of the reinforcement member 40 extend to the outside of the wall member 35. Such embedding can be provided by moulding the wall member 35 in mould with the reinforcement member 40 arranged in the mould before moulding.

The axial position at which the reinforcement member 40 may be different from what is shown in FIG. 3, where the reinforcement member 40 is arranged at half the distance between the proximal end 36 and the distal end 37. For instance, the reinforcement member 40 may be arranged at the distal end 37. However, the sealing ring 31 is in some situations attached to one of flanges 32, 33 either at the distal end 37 or proximal end 36 and in such situations, the reinforcement member 40 could advantageously be arranged with an axial distance from the attachment, since the attachment in itself provides a stiffness to the sealing ring 31 in an outward and inward direction.

As shown in FIG. 3, the sealing ring 31 may have an outwardly extending ring-shaped protrusion 41 at the proximal end 36 of the tapering wall member 35. This outwardly extending ring-shaped protrusion 41 has a first surface 42 facing in opposite direction than towards the distal end 37 and defining at least a part of the first abutment surface 38. In the embodiment shown in FIG. 3, the first surface fully forms the first abutment surface 39. In many applications, the first surface 42 is dimension so as to mate with the surface of the flange 32 in order to provide a fluid tight sealing.

This outwardly extending ring-shaped protrusion 41 also is in the shown embodiment configured to be fastened to, e.g. by being clamped against, said first or second flange 32, 33 (depending on the orientation in which the sealing ring is arranged) with the first abutment surface 8 abutting a surface of said first or second flange 32, 33. The attachment may be provided in other ways than being clamped such as by vulcanization, gluing or bolting. However, it is often preferred to have the sealing ring 31 fastened to the first flange 32 as this is a part of the guide claw 2 following the pump out of well thereby being easier to service.

Figure 3A:
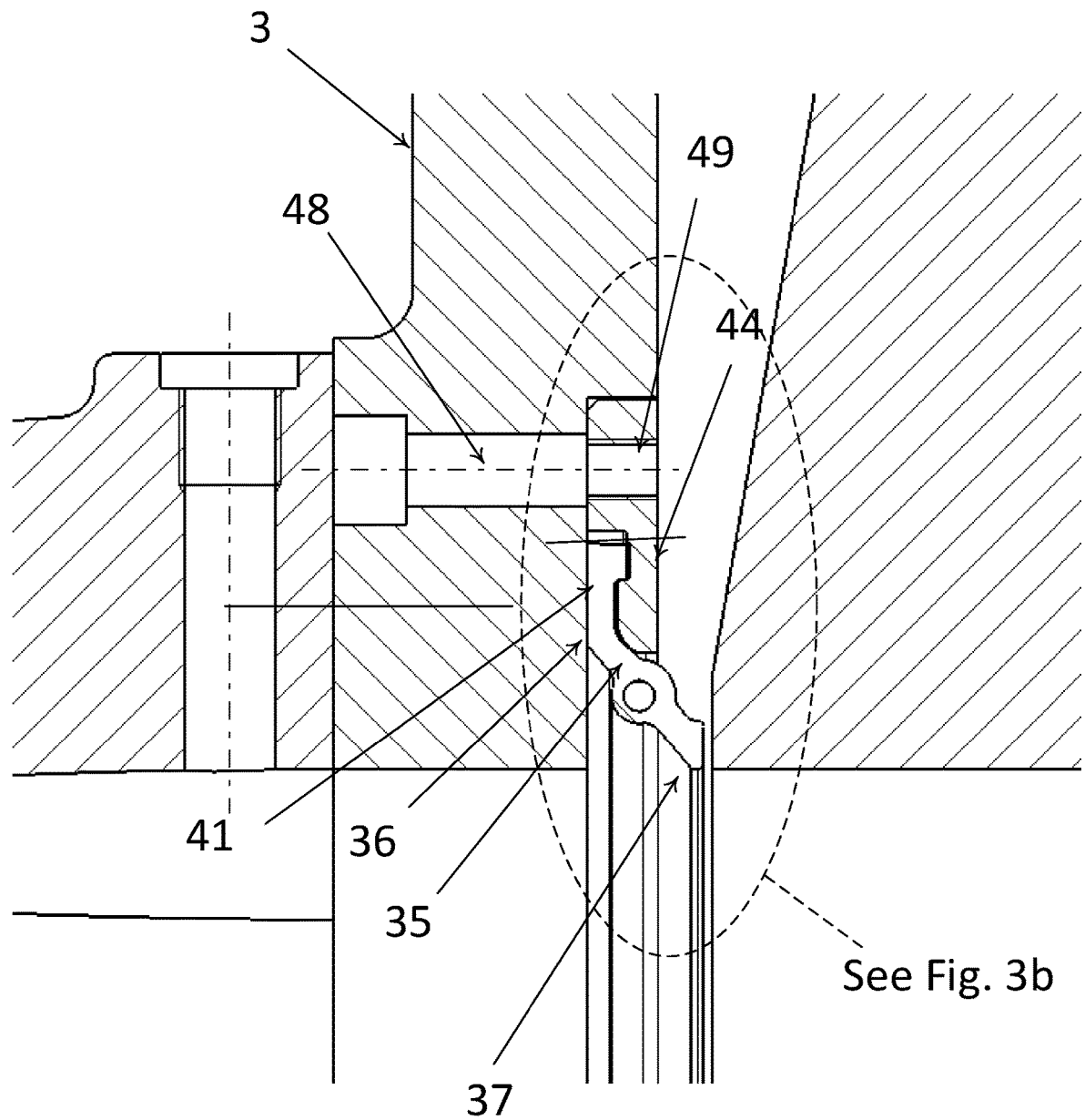
FIG. 3A and FIG. 3B where FIG. 3B are each a close-up of FIG. 2.
Figure 3B:
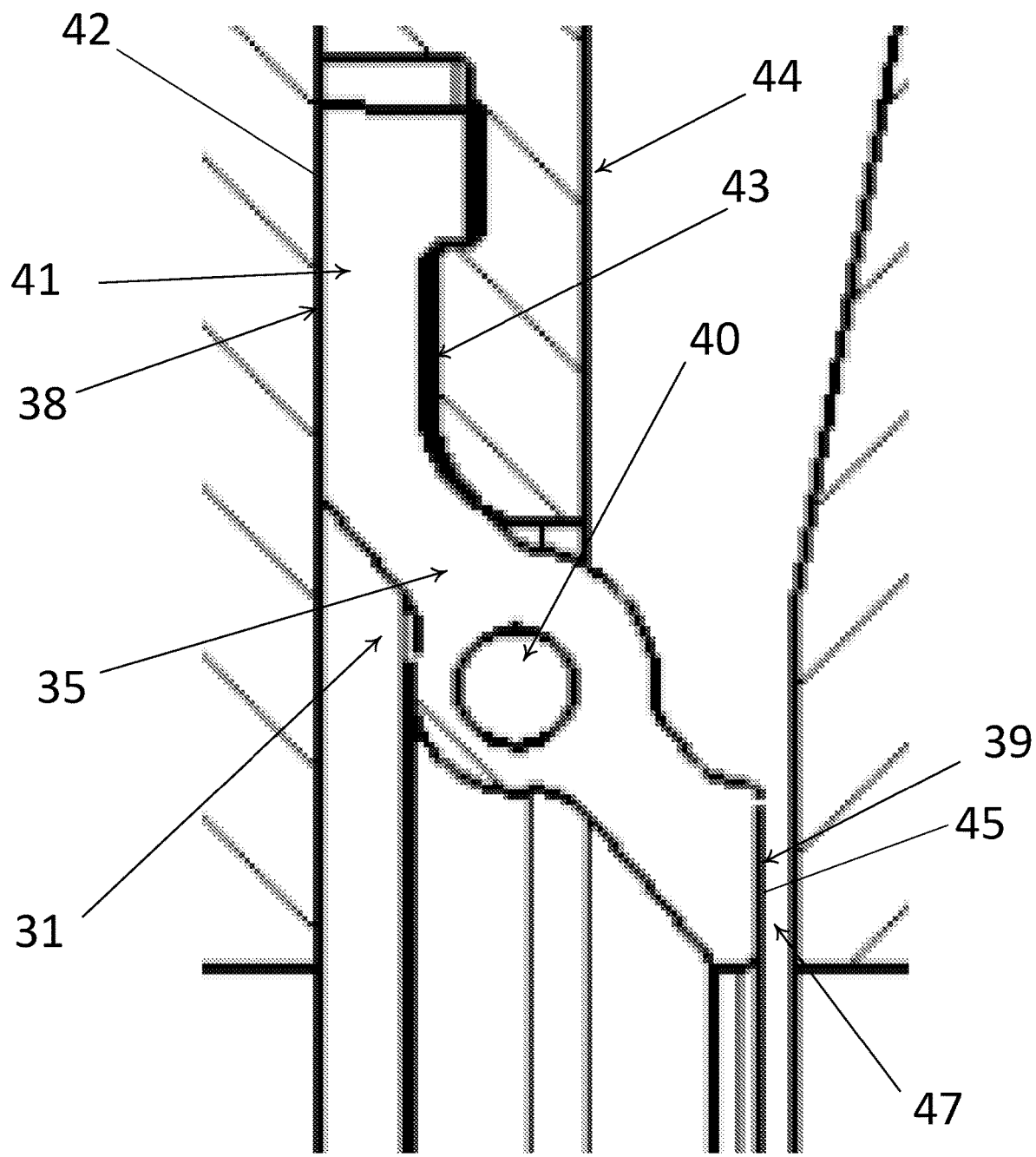
Figure 4:
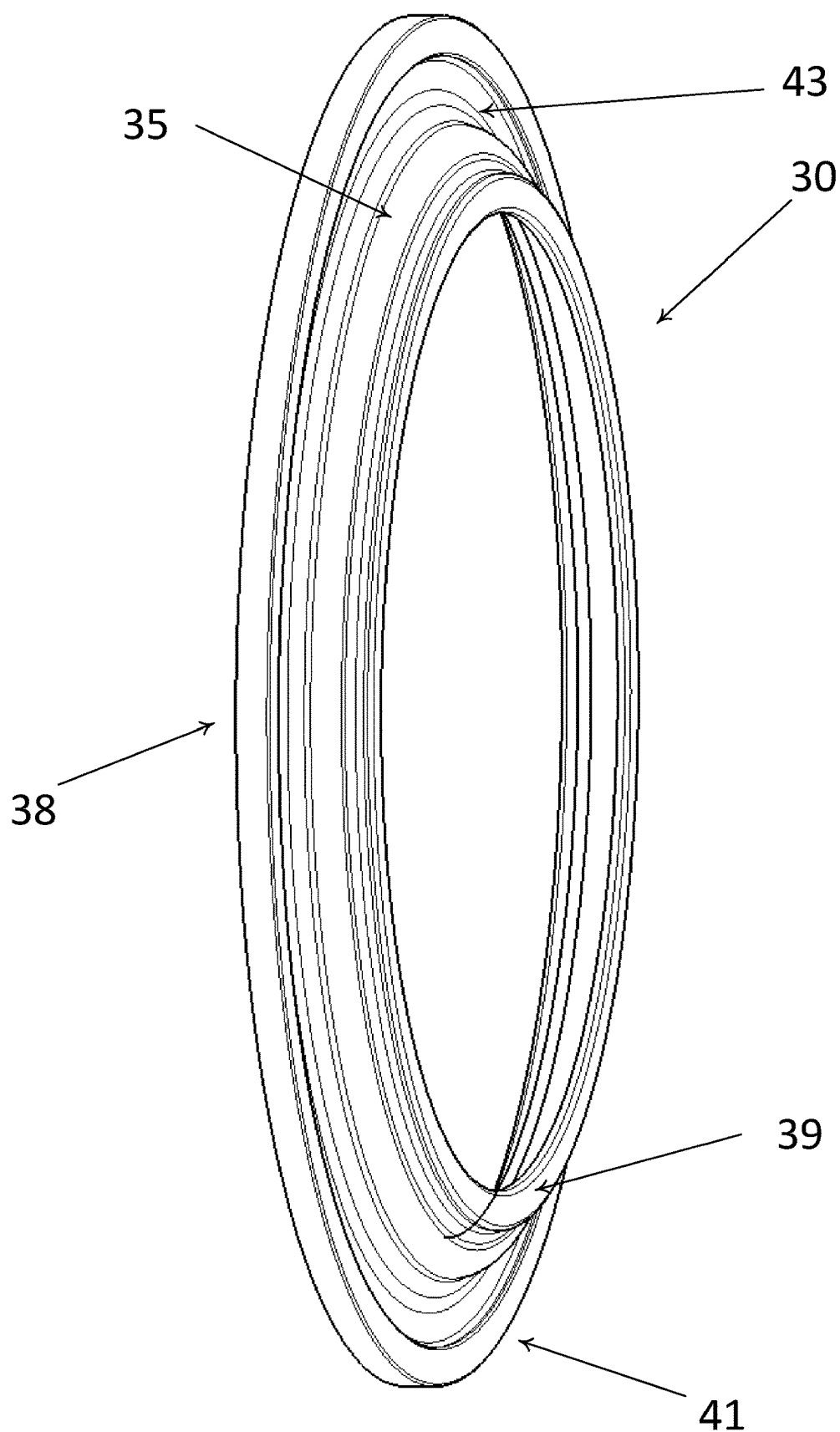
FIG. 4 illustrates in a 3-dimensional view a sealing ring according to a preferred embodiment of the invention.

In preferred embodiment where the ring-shaped protrusion 41 is configured to be clamped against a flange, the outwardly extending ring-shaped protrusion 41 advantageously has an indentation 43 (see FIG. 3b) arranged opposite the first abutment surface 38. In the embodiment shown in FIG. 3, this indentation is formed as an annular recess extending through 360 degrees of the sealing ring 31. This indentation 43 is shaped so that is can receive a protrusion of a clamping ring 44 and thereby being configured to co-operate with the clamping ring 44 for clamping the ring-shaped protrusion 41 against said first or second flange 32, 33. The clamping force is provided by bolting the clamping ring 44 to the flange as indicated in FIG. 3A. As shown in FIG. 3A a through going bore 48 is provided in guide claw and a thread 49 is provided in the clamping ring 44. Thus, when introducing a bolt into the bore 48, the bolt can engage with the thread 49 in the clamping to bias the clamping ring 44 against the guide claw 3 and thereby clamp the ring-shaped protrusion. The bore has at the side opposite to the clamping 44 an enlarged section so that a head of a bolt can be recessed in the guide claw 3 and not protruding above the surface of the guide claw 3.

In an alternative embodiment (not illustrated) the sealing ring 31 is configured to fit snugly into a recess provided in the first flange 32 or the second flange 33. Typically, the sealing ring is press-fitted in to recess.

As shown in FIG. 3, the distal end 37 of the sealing ring 31 has a second surface 45 facing in opposite direction than towards the proximal end 36 and defining at least a part of the second abutment surface 39. In the embodiment shown, the second surface 45 fully forms the second abutment surface 39. Like for the first surface 42 being dimension so as to mate with the surface of the flange 32 in order to provide a fluid tight sealing so may the second surface 45 be dimensions to mate the surface of the flange 33 to provide a fluid tight sealing.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

LIST OF REFERENCE NUMBERS USED

1 Pump
2 Base part
3 Guide claw
4 Lower support part
5 Upper support part
6 Second horizontal support surface
7 Second vertical support surface
8 Upper end
9 Lower end
11 Second guide member
12 First guide member
13 Resilient element
14 Second vertical abutment surface
15 Second horizontal abutment surface
16 Support surface
17 End face
18 Vertically inclined abutment surface
19 First horizontal support surface
20 Vertical extending lateral guide surface
21 Guide opening
22 Guide bars
23 Fluid channel
24 Though-going opening
25 Indentation
26 Opening
30 Electrical motor
31 Sealing ring
32 First flange
33 Second flange
35 Tapering wall member
36 Proximal end
37 Distal end
38 First abutment surface
39 Second abutment surface
40 Reinforcement member
41 Outwardly extending ring shaped protrusion
42 First surface
43 Indentation
44 Clamping ring
45 Second surface
46 Pump support
47 Gap
48 Bore
49 Thread

What is claimed is:

1. A sealing ring for providing a fluid seal between a first flange and a second flange, the sealing ring forming a tubular element, the sealing ring comprising:
a tapering wall member defining an interior funnel-shaped through-going opening extending axially and tapering from a proximal end to a distal end, the tapering wall member being made from a resilient material providing an axial deflection of the tapering wall member when exposed to an axial force;
a first abutment surface provided at the proximal end for providing a fluid seal when abutting a surface of one of the flanges;
a second abutment surface provided at the distal end for providing a fluid seal when abutting a surface of another one of the flanges; and
a reinforcement member made from a stiffer material than a material of the tapering wall member and being shaped as a closed ring-shaped element with an axial extension being smaller than an axial distance between the proximal end and the distal end, said reinforcement member being arranged in or on the tapering wall member at an axial position between the proximal end and the distal end so as to limit or prevent outward or inward deflection of at least a part of the tapering wall member when a pressure difference is applied across the tapering wall member.

2. A sealing ring according to claim 1, wherein the tapering wall member has a frusto-conical shape and the reinforcement member is a circular member.

3. A sealing ring according to claim 1, wherein an angle of the tapering wall member relative to an axial direction is less than 75 degrees.

4. A sealing ring according to claim 1, wherein the reinforcement member has a uniformed cross section throughout its extension.

5. A sealing ring according to claim 1, wherein the reinforcement member is embedded in the tapering wall member.

6. A sealing ring according to claim 5, wherein a thickness of the tapering wall member is locally increased in a region encircling the embedded reinforcement member.

7. A sealing ring according claim 1, wherein the axial position at which the reinforcement member is arranged is at half a distance between the proximal end and the distal end.

8. A sealing ring according to claim 1, wherein the sealing ring comprises an outwardly extending ring-shaped protrusion at the proximal end, said outwardly extending ring-shaped protrusion having a first surface facing in a direction opposite a direction towards the distal end and defining at least a part of the first abutment surface.

9. A sealing ring according to claim 8, wherein the outwardly extending ring-shaped protrusion is configured to be fastened to said first or second flange with the first abutment surface abutting a surface of said first or second flange.

10. A sealing ring according to claim 8, wherein the outwardly extending ring-shaped protrusion comprises an indentation arranged opposite the first abutment surface, said indentation being configured to cooperate with a clamping ring for clamping the ring-shaped protrusion against said first or second flange.

11. A sealing ring according to claim 1, wherein the sealing ring is configured to fit snugly into a recess provided in the first flange or the second flange.

12. A sealing ring according to claim 1, wherein the distal end has a second surface facing in direction opposite to a direction towards the proximal end and defining at least a part of the second abutment surface.

13. A pump support comprising:
a first flange;
a second flange; and
a sealing ring forming a tubular element, the sealing ring comprising:
 a tapering wall member defining an interior funnel-shaped through-going opening extending axially and tapering from a proximal end to a distal end, the tapering wall member being made from a resilient material providing an axial deflection of the tapering wall member when exposed to an axial force;
 a first abutment surface provided at the proximal end for providing a fluid seal when abutting a surface of one of the flanges;
 a second abutment surface provided at the distal end for providing a fluid seal when abutting a surface of another one of the flanges; and
 a reinforcement member made from a stiffer material than a material of the tapering wall member and being shaped as a closed ring-shaped element with an axial extension being smaller than an axial distance between the proximal end and the distal end, said reinforcement member being arranged in or on the tapering wall member at an axial position between the proximal end and the distal end so as to limit or prevent outward or inward deflection of at least a part of the tapering wall member when a pressure difference is applied across the tapering wall member, wherein the first and the second flange are configured to be connected with each other with the sealing ring disposed there in-between, both flanges comprising through going openings aligned when connected to each other with the sealing ring encircling the openings, wherein the first flange is configured for carrying or forming part of a pump housing and the second flange forms part of a fluid channel configured for receiving fluid from the pump housing and delivering the fluid at a delivery position, and wherein the sealing ring is arranged to provide a sealing between the first flange and the second flange.

14. A pump support according to claim 13, wherein the tapering wall member has a frusto-conical shape and the reinforcement member is a circular member.

15. A pump support according to claim 13, wherein an angle of the tapering wall member relative to an axial direction is less than 75 degrees.

16. A pump support according to claim 13, wherein the reinforcement member has a uniformed cross section throughout its extension.

17. A pump support according to claim 13, wherein the reinforcement member is embedded in the tapering wall member.

18. A pump support according to claim 17, wherein a thickness of the tapering wall member is locally increased in a region encircling the embedded reinforcement member.

19. A pump support according claim 13, wherein the axial position at which the reinforcement member is arranged is at half a distance between the proximal end and the distal end.

20. A method of providing a seal, the method comprising the steps of:
providing a pump support according to claim 13;
arranging the sealing ring on one of said first and second flanges; and
connecting the two flanges flange through-going openings aligned with the sealing ring encircling said through-going openings.

* * * * *